United States Patent Office 3,442,892

Patented May 6, 1969

3,442,892

IMIDAZOLIDINONE DERIVATIVES

Fuyuki Kusuda, Kyoto-fu, Masao Murayama, Yoshiharu Matsuo, and Hideo Okumura. Kyoto, and Nobukiyo Tatewaki, Kyoto-fu, Japan, assignors to Nippon Shinyaku Co. Ltd., Kyoto, Japan, a corporation of Japan No Drawing. Filed Mar. 7, 1966, Ser. No. 532,124
Claims priority, application Japan, June 11, 1965, 40/34,815
Int. Cl. C07d *49/34;* C09b *23/00*
U.S. Cl. 260—240 4 Claims

ABSTRACT OF THE DISCLOSURE

Compounds of formula

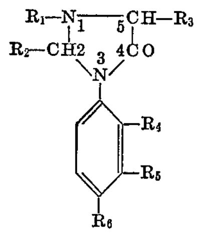

in which $R_1$ is hydrogen or lower alkyl, $R_2$ is a straight chain or branched alkyl containing between 1 and 10 carbon atoms, cinnamyl or phenyl, $R_3$ is hydrogen or a srtaight chain or branched lower alkyl or phenyl, and $R_4$, $R_5$ and $R_6$ are each hydrogen, a straight chain or branched lower alkyl, lower alkoxy, hydroxy or halogen, have analgesic, anti-inflammatory and antipyretic activity.

The present invention relates to new imidazolidinone derivatives of the formula:

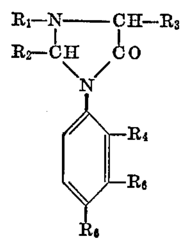

(I)

in which $R_1$ is hydrogen, alkyl or aralkyl, $R_2$ is alkyl, aralkyl or aryl, $R_3$ is hydrogen, alkyl, aralkyl or aryl, and $R_4$, $R_5$ and $R_6$ are each hydrogen, alkyl, alkoxy, halogen or a hydroxy group. The compounds I are novel, not reported previously in the literature, and are useful as medicinals since they have analgesic, anti-inflammatory and antipyretic actions with little toxicity. Many of the compounds are readily soluble in water and the insoluble derivatives may be converted into soluble salts by reaction with inorganic or organic acids. Thus they can all be administered by injection.

The novel compounds of the present invention are produced by the reaction of the amines of the formula:

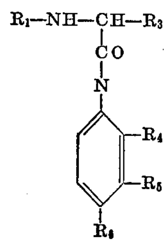

(II)

in which $R_1$, $R_3$, $R_4$, $R_5$ and $R_6$ have the above meanings and an aldehyde $R_2CHO$ in which $R_2$ has the above meaning.

The starting material amines may be prepared by the following reaction:

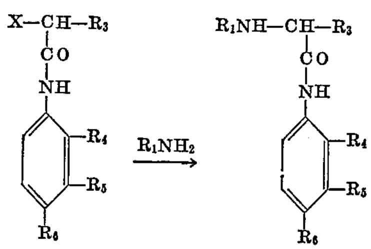

in which X is halogen and $R_1$, $R_3$, $R_4$, $R_5$ and $R_6$ have the above meanings.

In conducting the reaction the starting material amines are allowed to react with the aldehydes in aqueous, alcoholic or aqueous alcoholic solution at room temperature or with heating. As the solvent such slightly higher alcohols as isobutanol may be employed. The amines are usable in free form as well as their inorganic salts such as hydrochlorides. The reaction of free amine and aldehyde may be conducted in the presence of inorganic acid. The reaction conditions are set forth hereinafter.

For anti-inflammatory action the suppression rate of the compounds on edema induced by egg white was estimated and the values were compared with those with aminopyrine. Egg white was injected subcutaneously into rat's paw and the volume (A) of the edema there induced was measured. Then the compounds were injected subcutaneously or intraperitoneally and the volume of the edema after the injection was estimated. The value obtained by dividing $(B-A)$ by A, indicated the edema-suppression rate. Larger value of this rate then shows that the edema suppressing action and consequently the anti-inflammatory action of the administered compound are large. For the purpose of comparison aminopyrine was administered into the same group of rats and the edema-suppression rate was similarly obtained. The values that were obtained by dividing the edema-suppression rates of the compounds of the present invention by the rate of aminopyrine are shown below. The dose administered was 100 mg./kg. for both the new compounds and aminopyrine.

| Administered compound of Example: | Edema-suppression rate of the compounds/the rate of aminopyrine |
|---|---|
| 2 | 1.3 |
| 5 | 2.22 |
| 11 | 1.88 |
| 16 | 1.49 |
| 26 | 2.33 |
| 27 | 2.17 |
| 28 | 2.15 |
| 29 | 3.31 |
| 30 | 2.54 |
| 32 | 2.84 |
| 33 | 2.70 |
| 34 | 2.18 |
| 35 | 3.88 |
| 36 | 3.74 |
| 37 | 2.07 |

Below are shown are values of anti-inflammatory action by the Cotton pellet method. The dose of the medicinals was 100 mg./kg.

| Administered compound of Example: | Anti-inflammatory action |
|---|---|
| 30 | 35.0 |
| 31 | 29.0 |
| 35 | 45.0 |
| 36 | 29.0 |

As these data show, the compounds of the present invention all have distinctive anti-inflammatory action, being more powerful than the action of aminopyrine.

In the next place the analgesic action of these compounds was examined by the modified Haffner method. To groups of mice, one group consisting of 8 animals, morphine in a dose below the threshold amount was previous administered and compounds (dose 100 mg./kg.) were injected intraperitoneally. Then pain was applied to the tail and appearance of the analgesic effect was observed. The results are given as follows.

| Administered compound of Example: | Analgesic action (number of effective animals/ number of used animals) |
|---|---|
| 5 | 5/8 |
| 30 | 7/8 |
| 31 | 5/8 |
| 37 | 7/8 |

It is clear that the compounds employed showed distinctive analgesic action in more than half of the mice studied. In similar experiments with aminopyrine, there was analgesic action in merely 2 out of 8 animals studied.

The invention is illustrated by the following non-limitative examples.

Example 1.—1,2-dimethyl-3-phenyl-4-imidazolidinone (A) When 1 g. of acetaldehyde and 5 ml. of water were added to 3.3 g. of α-monomethylaminoacetanilide there occurred a spontaneous warming and a homogeneous solution was obtained. After cooling it was salted out with sodium chloride and then extracted with benzene. The extract was treated in the conventional manner to give a residue which was recrystallized from n-hexane-benzene and there was obtained 3.6 g. (94.5%) of 1,2-dimethyl-3-phenyl-4-imidazolidinone, M.P. 64–65° C.

*Analysis.*—Calculated for $C_{11}H_{14}N_2O$ (190.24): C, 69.44%; H, 7.42%; N, 14.73%. Found: C, 69.56%; H, 7.65%; N, 15.13%.

(B) To 5 g. of α-monomethylaminoacetanilide were added 1.6 g. of acetaldehyde and 3 ml. of 10% hydrochloric acid and the mixture heated in a water-bath at 90–100° C. for 3 days. After cooling it was made alkaline with alkali carbonate and extracted with benzene. The extract was treated by the conventional manner and a residue was obtained. Recrystallization of the residue from n-hexane-benzene gave 5.75 g. (98.4%) of 1,2-dimethyl-3-phenyl-4-imidazolidinone of M.P. 64–65° C. The product did not depress the melting point in admixture with the above preparation.

(C) Two grams of α-monomethylaminoacetanilide and 0.65 g. of acetaldehyde were treated in a manner similar to that in (B) and the product was recrystallized from n-hexane-benzene to give 1.7 g. (74%) of 1,2-dimethyl-3-phenyl-4-imidazolidinone, M.P. 64–65° C. This preparation did not depress the melting point on admixing with the preparation obtained in (A).

Example 2.—1-methyl-2,3-diphenyl-4-imidazolidinone

A mixture of 3.3 g. of α-monomethylaminoacetanilide, 2.2 g. of benzaldehyde, 5 ml. of water, and 18 ml. of ethanol was made homogeneous and heated in a water-bath for 2 hours. After cooling it was extracted with chloroform and the extract was treated in the conventional way to give a residue which was recrystallized from benzene. 1-methyl-2,3-diphenyl-4-imidazolidinone, M.P. 102–103° C., was obtained in a yield of 4.2 g. (82%).

*Analysis.*—Calculated for $C_{16}H_{16}N_2O$ (252.30): C, 76.16%; H, 6.39%; N, 11.10%. Found: C, 75.87%; H, 6.36%; N, 11.28%.

Example 3.—1-methyl-2-phenyl-3-(p-methoxyphenyl)-4-imidazolidinone

A mixture of 8.2 g. of α-monomethylamino-α-(p-methoxyphenyl)-acetanilide and 5.9 g. of benzaldehyde was dissolved in 30 ml. of ethanol and refluxed for 2 hours. After cooling the separated crystals were filtered off and recrystallized from ethanol to give 8.5 g. (72%) of 1-methyl-2-phenyl-3-(p-methoxyphenyl)-4-imidazolidinone-(5).

*Analysis.*—Calculated for $C_{17}H_{18}N_2O_2$ (282.33): C, 72.32%; H, 6.43%; N, 9.92%. Found: C, 72.33%; H, 6.42%; N, 9.84%.

Example 4.—1,2-dimethyl-3-phenyl-5-isopropyl-4-imidazolidinone-hydrochloride

Twelve grams of α-monomethylaminoisovaleroylanalide were suspended in a small volume of water and to this were added 5.3 g. of acetaldehyde and 30 ml. of alcohol and the whole was heated under reflux in a water-bath for 1 hour. After cooling it was concentrated under reduced pressure and the residue extracted with benzene. The residue obtained after the conventional treatment of the extract, in oil, was distilled under reduced pressure to give 8 g. (62.5 g.) of 1,2-dimethyl-3-phenyl-5-isopropyl-4-imidazolidinone, B.P. 136–146° C./4.5 mm. This was dissolved in ether and ethereal hydrochloride acid was added to separate the hydrochloride which was filtered off and recrystallized from ether-alcohol to give 1,2-dimethyl-3-phenyl-5-isopropyl-4-imidazolidinone-hydrochloride, M.P. 165–167° C.

*Analysis.*—Calculated for $C_{14}H_{21}ON_2Cl$ (268.79): C, 62.56%; H, 7.86%; N, 10.42%. Found: C, 62.73%; H, 7.85%; N, 10.55%.

Example 5.—1,2-dimethyl-3-(o-tolyl)-4-imidazolidinone

A mixture of 10 g. of o-(α-monomethylaminoaceto)-toluidide, 21 g. of 10% hydrochloric acid, and 150 ml. of water was added to 4.65 g. of 80% aqueous acetaldehyde and the whole was allowed to stand at room temperature for 3 days, and after neutralization with alkali carbonate it was salted out with sodium chloride. The oil that was separated was extracted out with benzene and the extract treated in the conventional manner to give an oily residue which was disilled under reduced pressure. 1,2-dimethyl-3-(o-tolyl)-4-imidazolidinone was obtained in a yield of 8.3 g. (72.4%) and its boiling point was 130° C./2 mm. It was converted into picrate in ethanol and the salt recrystallized from acetone-ethanol; M.P. 145° C., yellow crystals.

*Anaylsis.*—Calculated for the picrate: C, 49.88%; H, 4.42%; N, 16.16%. Found: C, 49.53%; H, 4.44%; N, 15.55%.

Example 6.—1-methyl-2-cinnamyl-3-phenyl-5-butyl-4-imidazolidinone

Ten grams of α-monomethylamino-caproylanilide and 7.8 g. of cinnamylaldehyde were dissolved in ethanol and refluxed for 3 hours and then treated in a manner similar to the treatment in Example 2. The residue obtained was distilled under reduced pressure to give 10.3 g. of 1-methyl-2-cinnamyl-3-phenyl-5-butyl-4-imidazolidinone in an oil with B.P. 208–210° C./3 mm. This was treated in usual manner with hydrochloric acid and the product recrystallized from ether-ethanol to give the hydrochloride of M.P. 146–148° C.

Example 1.—1-methyl-2-n-propyl-3-(o-tolyl)-5-isopropyl-4-imidazolidinone

Eight grams of o-(α-monomethylaminoisovaleroyl)-toluidide and 5.3 g. of n-butylaldehyde were added to 30 ml. of isobutyl alcohol and the mixture was refluxed in an oil-bath for 2 hours. After the solvent was evaporated off the residue was distilled under reduced pressure for give 5.1 g. of 1-methyl-2-n-propyl-3-(o-tolyl)-5-isopropyl-4-imidazolidinone (yield 50%) of B.P. 150–154° C./2.5 mm.

*Analysis*.—Calculated for $C_{17}H_{26}ON_2$ (274.39): C, 74.41%; H, 9.55%; N, 10.21%. Found: C, 74.47%; H, 9.64%; N, 10.21%.

By employing the reaction conditions of these examples various other compounds according to the invention were produced as given in the following table.

What is claimed is:

1. The compound 1-methyl-2,3-diphenyl-4-imidazolidinone.

2. The compound 1-methyl - 2 - phenyl-3-(p-methoxyphenyl)-4-imidazolidinone.

3. The compound 1-methyl - 2 - cinnamyl-3-phenyl-5-butyl-4-imidazolidinone.

4. The compound 1-methyl - 2 - n-propyl-3-(o-tolyl)-5-isopropyl-4-imidazolidinone.

| Ex. No. | $R_1$ | $R_2$ | $R_3$ | $R_4$ | $R_5$ | $R_6$ | Material (g.) Amine | Material (g.) Aldehyde (Concen. percent) | Reaction conditions (example number) | Recrystallization solvent | Melting point (boiling point) | Yield (g.) (in percent) | Melting point of salt |
|---|---|---|---|---|---|---|---|---|---|---|---|---|---|
| 9 | Me | H | i-Pr | H | H | H | 18 | 9.3 (37%) | 2 | | (140–3°/3.5) | 8.8 (19.7%) | Picrate 160–162°. |
| 10 | Me | H | Ph | H | H | H | 4 | 1.76 (37%) | 2 | Dil. EtOH | 108.5–110° | 3.5 (83.5%) | |
| 11 | Me | Me | Ph | H | H | H | 3 | 0.9 | 2 | | 120–122° | 1.7 (51.2%) | HCl 148–149.5°. |
| 12 | Me | Bu | Ph | H | H | H | 10.5 | 4.1 | 3 | $Et_2OH$–$C_6H_{14}$ | 92–93.5° | 3.5( 27.3%) | |
| 13 | Me | H | H | Me | H | H | 10 | 9.2 | 5 | | (130°/2) | 9.3 (87.2%) | HCl 190–192°, Picrate 173°. |
| 14 | Et | H | H | Me | H | H | 31 (HCl salt) | 22 (37%) | 1(C) | | (140–141°/3) | 24.6 (88%) | Picrate 166–168°. |
| 15 | Me | H | H | H | MeO | H | 2 | 1 (37%) | 1(B) | $C_6H_{14}$–$C_6H_6$ | 51–52° | 2 (94.5%) | |
| 16 | Et | Ph | H | MeO | H | H | 10 | 5.2 | 3 | EtOH. $C_6H_{14}$ | 122° | 12.5 (87.8%) | |
| 17 | Me | H | H | H | H | OMe | 11.6 | 6.4 (37%) | 1(A) | $C_6H_{14}$ | 71–72° | 8.5 (69%) | |
| 18 | Me | Me | H | H | H | OMe | 11.6 | 4.3 | 1(A) | $C_6H_{14}$ | 94–95° | 9.0 (69%) | |
| 19 | Me | Ph | H | H | H | OMe | 8.2 | 5.9 | 3 | EtOH | 100–101° | 8.5 (72%) | |
| 20 | Me | H | H | H | H | OEt | 4 | 2.1 (37%) | 1(A) | $C_6H_{14}$ | 52–53° | 2.0 (47.4%) | |
| 21 | Me | Me | H | H | H | OEt | 8 | 2.85 | 2 | $C_6H_{14}$ | 104–105° | 5 (56.0%) | |
| 22 | Me | Ph | H | H | H | OEt | 4.8 | 3.2 | 2 | EtOH | 128–129° | 4.8 (71.0%) | |
| 23 | Me | H | H | H | H | Br | 13.6 | 5.9 (37%) | 1(B) | EtOH | 89–95° | 13.4 (95.3) | |
| 24 | Me | Ph | H | H | H | Br | 5 | 2.8 | 3 | Dil. EtOH | 126–127° | 5.6 (82.3%) | |
| 25 | Me | H | Bu | H | H | H | 5.4 | 2.6 (37%) | 2 | | (169–170°/3.0) | 5.4 (95%) | |
| 26 | Me | Me | Bu | H | H | H | 10 | 3.3 | 3 | | 166/3.0 | 9.8 (87.5%) | |
| 27 | Me | i-Pr | H | H | H | H | 14 | 7 | 2 | EtOH | 105–106° | Quant. | |
| 28 | Me | Ph | Bu | H | H | H | 10 | 6.3 | 2 | EtOH | 96–97° | 12.4 (83%) | |
| 29 | Me | De | Bu | H | H | H | 5.3 | 5.8 | 1(B) | | (206–207°/15) | 5.3 (59%) | |
| 30 | Me | Pr | H | Me | H | H | 10 | 5.3 | 2 | | (163–166°/7) | 11.3 (86%) | |
| 31 | Me | i-Pr | H | Me | H | H | 10 | 5.3 | 2 | $C_6H_{14}$ | 43–44° | 12 (98%) | |
| 32 | Me | Hp | H | Me | H | H | 7 | 10.1 | 2 | | (179–180°/6) | 8.2 (72%) | |
| 33 | Et | Me | H | Me | H | H | 20 | 11.5 | 1(B) | | (148–150°/3.5) | 19.2 (85%) | |
| 34 | Me | Me | Ph | H | H | OEt | 5.5 | 2.2 | 2 | $C_6H_{14}$–$C_6H_6$ | 110–112° | 3.2 (49.6%) | |
| 35 | Me | Hp | Bu | H | H | Me | 5.7 | 4.7 | 2 | | (193°/1.0) | 7.2 (86%) | |
| 36 | Me | De | Bu | H | H | Me | 7.0 | 6.6 | 2 | | (218–222°/1.5) | 4.5 (39%) | |
| 37 | Me | Me | H | H | H | Br | 7.4 | 2.2 | 2 | EtOH | 107–108° | 5 (61%) | |

De=Decyl; Hp=Heptyl.

References Cited

FOREIGN PATENTS 1,413,943 9/1965 France.
1,036,280 7/1966 Great Britain.

OTHER REFERENCES

Netherlands Application No. 6,409,088, February 1965, pp. 1–13 relied on and 1 page drawing.

Chem. Abst. vol. 63, Subject Index A–I, p. 1585S (1965).

HENRY R. JILES, *Primary Examiner.*

NATALIE TROUSOF, *Assistant Examiner.*

U.S. Cl. X.R.

260—309.7, 558, 562, 999